UNITED STATES PATENT OFFICE.

JOHN HOLMES, OF JERSEY CITY, NEW JERSEY, ASSIGNOR OF ONE-HALF HIS RIGHT TO GEORGE H. COUTTS, OF NEW YORK, N. Y.

IMPROVEMENT IN SUGAR-COATED BISCUITS.

Specification forming part of Letters Patent No. 202,944, dated April 30, 1878; application filed February 23, 1878.

*To all whom it may concern:*

Be it known that I, JOHN HOLMES, of Jersey City, in the State of New Jersey, have invented a new and useful Improvement in Biscuits, of which the following is a specification:

The article which forms the subject of this invention is a sugar-coated biscuit, and is made substantially as follows: Stated generally, flour, preferably prepared as in the manufacture of what is known in the trade as "English biscuit," is formed into the requisite shapes and sizes, then baked, and afterward the biscuits are coated with sugar. Stated more specifically, the flour is mixed with the proper quantity of milk or water for making biscuit, and the mass kneaded into dough, sufficient lard or butter being used to give the desired crispness, richness, and lightness. The dough is then rolled into sheets of convenient thickness, and by the use of dies, molds, or otherwise, is formed into whatever shapes and sizes may be preferred. These forms or pieces are then baked in ovens, in the usual manner of baking biscuits or small cakes, and, when baked, are coated by dipping them in sirup of such quality and consistency that it will harden into sugar as it cools, and form a complete envelope or coating to the flour biscuit. When the coating has become sufficiently cool it is desirable to roll the biscuits in heated pans or tumblers to smooth and finish the coating. If a small quantity of corn-starch or equivalent material is put into the vessels with the biscuits during the rolling operation, the sugar-coating will be finished with a gloss or polish which will add to the beauty of their appearance, and will assist to render them impervious to the air.

The coating of sugar itself which covers the biscuits is found very efficacious in protecting the interior from the action of the air; but its efficiency in this respect is increased by the use of starch or equivalent material, as above described, by which the coating of sugar is filled and its surface polished.

It is not intended to limit the invention to any special shape or size of the finished article, or to any fixed proportions of the ingredients which form the interior or the coating of the biscuits, or to the manner of their preparation; but it is intended to include any biscuit or prepared baked flour when the same is coated with sugar.

The advantages of the invention are twofold, viz:

First, it provides a convenient and healthful article of food, and at the same time, by a change in size only, a pleasant confection or sweetmeat. When they are desired as an article of food alone, they may be made of considerably larger size than when desired as sweetmeats, and, if coated by dipping, the proportion of sugar to the flour will be less as the size is increased.

Second, the prepared baked flour, by being coated with sugar, will be largely preserved from the deleterious effects of atmospheric influences and climatic changes, and will retain its freshness, sweetness, and nutritious properties for a much longer time than if unprotected.

I am aware that various medicinal preparations in the form of pills have been sugar-coated to make them more palatable; so, also, confections have been produced by sugar-coating nuts.

What is claimed as a new article of manufacture is—

1. A biscuit composed of hard-baked flour and coated with sugar, substantially as and for the purpose described.

2. A sugar-coated biscuit the coating of which is filled and polished by the use of starch or equivalent material, substantially as and for the purpose described.

JOHN HOLMES.

Witnesses:
BENJ. A. SMITH,
ROBT. L. WINNS.